(12) United States Patent
Nager et al.

(10) Patent No.: US 9,469,412 B2
(45) Date of Patent: Oct. 18, 2016

(54) REDUNDANT MOUNT SYSTEM

(71) Applicant: United Technologies Corporation, Hartford, CT (US)

(72) Inventors: Eric Andrew Nager, El Cajon, CA (US); David Lau, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/439,356

(22) PCT Filed: Oct. 28, 2013

(86) PCT No.: PCT/US2013/067022
§ 371 (c)(1),
(2) Date: Apr. 29, 2015

(87) PCT Pub. No.: WO2014/070640
PCT Pub. Date: May 8, 2014

(65) Prior Publication Data
US 2015/0298815 A1      Oct. 22, 2015

Related U.S. Application Data

(60) Provisional application No. 61/721,605, filed on Nov. 2, 2012.

(51) Int. Cl.
*B42F 13/00* (2006.01)
*B64D 41/00* (2006.01)
(52) U.S. Cl.
CPC ......... *B64D 41/00* (2013.01); *B64D 2041/002* (2013.01)

(58) Field of Classification Search
CPC ................. B64D 41/00; B64D 2041/002
USPC ........... 244/54; 248/3, 5, 13, 15, 18, 20, 358
See application file for complete search history.

(56) References Cited

U.S. PATENT DOCUMENTS

| | | | | |
|---|---|---|---|---|
| 3,907,220 A | * | 9/1975 | Amelio | B64D 27/18 244/54 |
| 5,871,176 A | * | 2/1999 | Demouzon | B64D 27/18 244/54 |
| 5,873,547 A | | 2/1999 | Dunstan | |
| 5,902,050 A | * | 5/1999 | Balczun | F16C 11/0614 267/141 |
| 8,413,926 B2 | * | 4/2013 | Olsen | B64D 41/00 244/54 |
| 2002/0084381 A1 | | 7/2002 | Lemire | |
| 2007/0120037 A1 | | 5/2007 | Martinez Rueda | |
| 2010/0012775 A1 | | 1/2010 | Howard | |
| 2011/0084192 A1 | | 4/2011 | Olsen et al. | |

OTHER PUBLICATIONS

International Search Report from corresponding PCT/US2013/067022.
International Preliminary Report on Patentability for International Application No. PCT/US2013/067022 mailed May 14, 2015.

\* cited by examiner

*Primary Examiner* — Mark Wendell
(74) *Attorney, Agent, or Firm* — Carlson, Gaskey & Olds, PC

(57) ABSTRACT

An auxiliary power unit mounting system according to an exemplary aspect of the present disclosure includes, among other things, a plurality of linkages to support an auxiliary power unit, and a redundant mount to selectively support said auxiliary power unit.

7 Claims, 4 Drawing Sheets

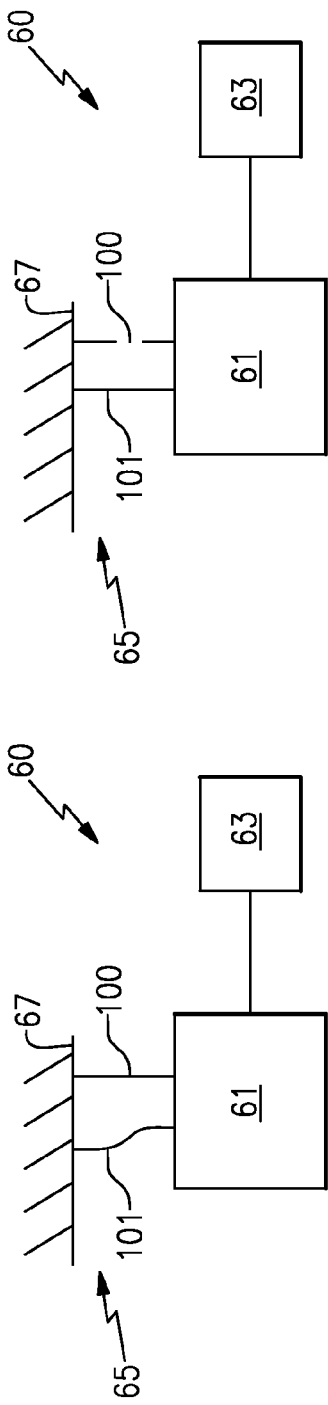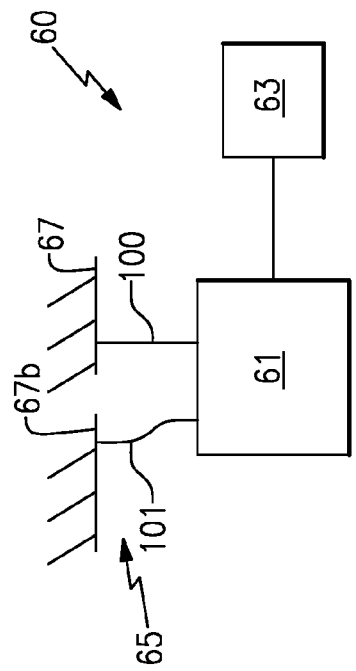

REDUNDANT MOUNT SYSTEM

CROSS REFERENCE TO RELATED APPLICATION

This application is the U.S. national phase of PCT/US13/67022, filed Oct. 28, 2013, which claims priority to U.S. Provisional Application No. 61/721,605, filed Nov. 2, 2012.

BACKGROUND

This disclosure relates generally to a redundant mount system for an auxiliary power unit. Auxiliary power units (APUs) are typically mounted within a tail cone or elsewhere in an aircraft. An APU can provide electric, pneumatic, or hydraulic power prior to start-up of the main gas turbine engines for the aircraft.

SUMMARY

An auxiliary power unit mounting system according to an exemplary aspect of the present disclosure includes, among other things, a plurality of linkages to support an auxiliary power unit, and a redundant mount to selectively support the auxiliary power unit.

In a further non-limiting embodiment of the foregoing auxiliary power unit mounting system, the plurality of linkages includes a three-link mount, a two-link mount, and a single-link mount.

In a further non-limiting embodiment of either of the foregoing auxiliary power unit mounting systems, the three link mount is configured to restrict the auxiliary power unit in three degrees of movement, the two link mount is configured to restrict the auxiliary power unit in two degrees of movement, and the single link mount is configured to restrict the auxiliary power unit in one degree of movement.

In a further non-limiting embodiment of any of the foregoing auxiliary power unit mounting systems, the redundant mount is a first redundant mount, and the system further includes a second redundant mount to selectively support the auxiliary power unit.

In a further non-limiting embodiment of any of the foregoing auxiliary power unit mounting systems, the first redundant mount is fixed to the auxiliary power unit at a first position, and the second redundant mount is fixed to the auxiliary power unit at a second position, wherein the first position is circumferentially spaced from the second position about a central axis of the auxiliary power unit.

In a further non-limiting embodiment of any of the foregoing auxiliary power unit mounting systems, the redundant mount is configured to support the auxiliary power unit during an abnormal operation.

In a further non-limiting embodiment of any of the foregoing auxiliary power unit mounting systems, a plurality of electrical wires communicate power to the auxiliary power unit and the electrical wires are distinct from the redundant mount.

In a further non-limiting embodiment of any of the foregoing auxiliary power unit mounting systems, the redundant mount is configured to be fixed to an aircraft structure.

In a further non-limiting embodiment of any of the foregoing auxiliary power unit mounting systems, the redundant mount is configured to be fixed to the auxiliary power unit and to an aircraft structure.

In a further non-limiting embodiment of any of the foregoing auxiliary power unit mounting systems, the first and second redundant mounts are fixed to an aircraft structure.

A method of mounting an auxiliary power unit according to another exemplary aspect of the present disclosure includes, among other things, securing a plurality of linkages to an auxiliary power unit, securing the plurality of linkages to an aircraft structure, securing a redundant mount to the auxiliary power unit, and securing the redundant mount to the aircraft.

In a further non-limiting embodiment of the foregoing method, the method includes restricting the auxiliary power unit in three degrees of movement using a three link mount, restricting the auxiliary power unit in two degrees of movement using a two link mount, and restricting the auxiliary power unit in one degree of movement using a one link mount.

In a further non-limiting embodiment of either of the foregoing methods, the redundant mount is a first redundant mount, and the method further includes securing a second redundant mount to the auxiliary power unit and securing the second redundant mount to the aircraft.

In a further non-limiting embodiment of any of the foregoing methods, the first redundant mount is secured to the auxiliary power unit at a first position, the second redundant mount is secured to the auxiliary power unit at a second position, the first position circumferentially spaced from a second position about a central axis of the auxiliary power unit.

In a further non-limiting embodiment of any of the foregoing methods, the first position is circumferentially spaced at least 90 degrees from the second position.

In a further non-limiting embodiment of any of the foregoing methods, the first redundant mount is secured to the auxiliary power unit at a first side, the second redundant mount is secured to the auxiliary power unit at a second side, and the first side is substantially opposite the second side.

In a further non-limiting embodiment of any of the foregoing methods, the first redundant and the second redundant are configured to support the auxiliary power unit during an abnormal operation.

In a further non-limiting embodiment of any of the foregoing methods, the method further includes securing a third redundant mount to the auxiliary power unit and securing the third redundant mount to the aircraft.

In a further non-limiting embodiment of any of the foregoing methods, the first and second redundant mounts are cables.

A redundant cable mount for an auxiliary power unit according to another exemplary aspect of the present disclosure includes, among other things, a cable having a first end and a second end, an attachment feature at the first end to attach the cable to an auxiliary power unit, and a second attachment feature at the second end to attach the cable to a frame of an aircraft.

BRIEF DESCRIPTION OF THE DRAWINGS

These and other features of the disclosed examples can be best understood from the following specification and drawings, the following of which is a brief description.

FIG. 1A shows a highly schematic view of an example auxiliary power unit.

FIG. 1B shows a highly schematic view of the example auxiliary power unit of FIG. 1 during an abnormal operation.

FIG. 1C shows a highly schematic view of an alternative example auxiliary power unit.

DETAILED DESCRIPTION

Figure 2:
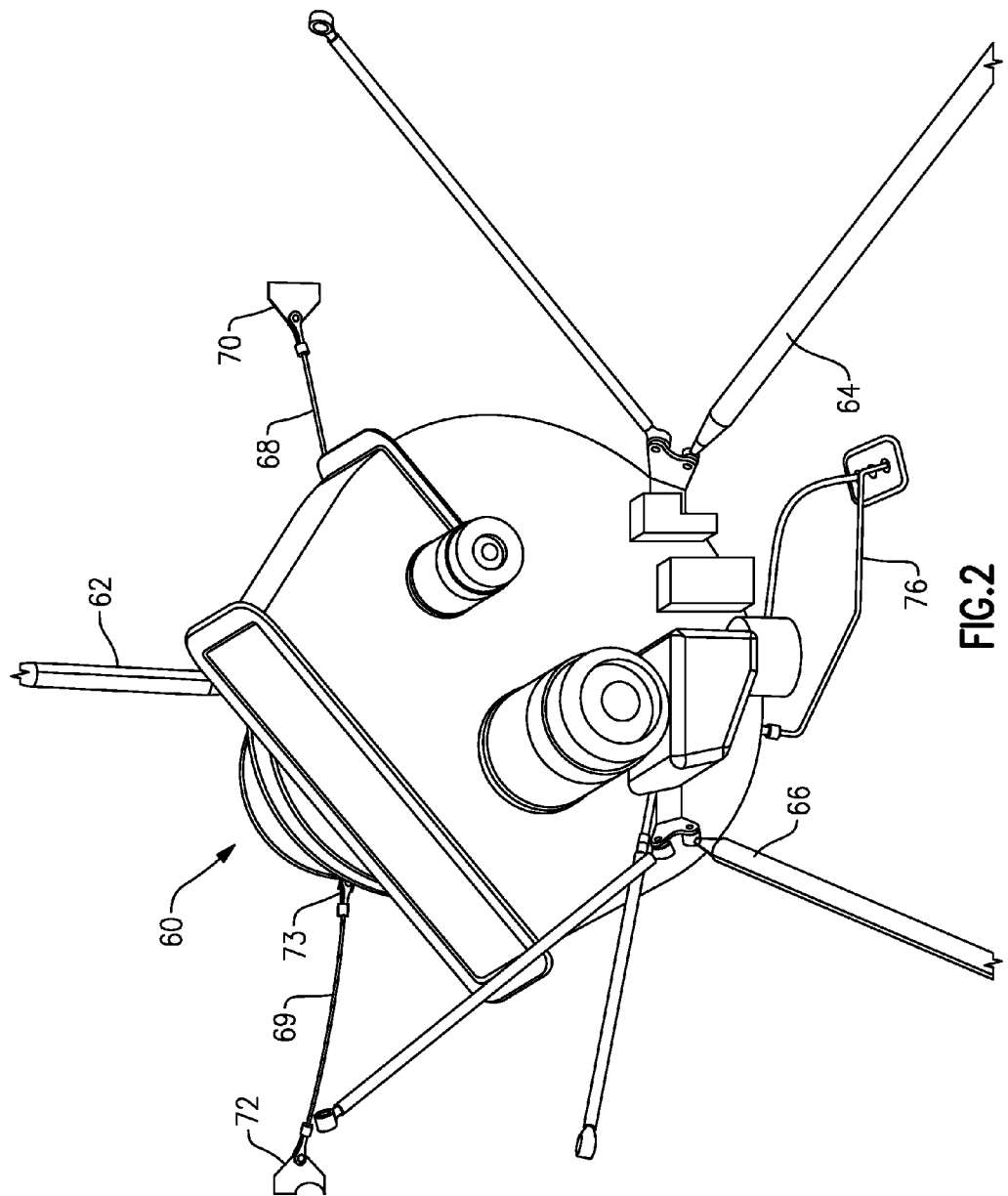
FIG. 2 shows a perspective front view of the example auxiliary power unit of FIG. 1.

Referring to FIG. 1A, an example APU 60 includes a turbine section 61 that drives a generator 63 to generate electricity. The APU 60 provides power prior to, for example, start-up the main gas turbine engines of an aircraft. The APU 60 may also provide electric and pneumatic power to the aircraft while the aircraft is stationary. Generally, the APU 60 provides power to the aircraft systems to either supplement or substitute power generated by the main gas turbine engines.

The example APU 60 is mounted to the structure 67 of the aircraft through a mount system 65. The mount system 65 includes a primary mount system 100 and a redundant mount system 101. The structure 67 may be any aircraft structure, but the example APU 60 is mounted within the tailcone. The structure 67 is thus a structure near the tailcone. Alternatively, as illustrated schematically in FIG. 1B, the primary mount system 100 could be mounted to a structure 67 and the redundant mount system 101 could be mounted to a second structure 67b. During normal operation, the primary mount system 100 provides support to the APU 60, as shown schematically in FIG. 1A. The redundant mount system 101 is configured to support the APU during an abnormal operation. Abnormal operation is shown schematically in FIG. 1C.

Figure 3:
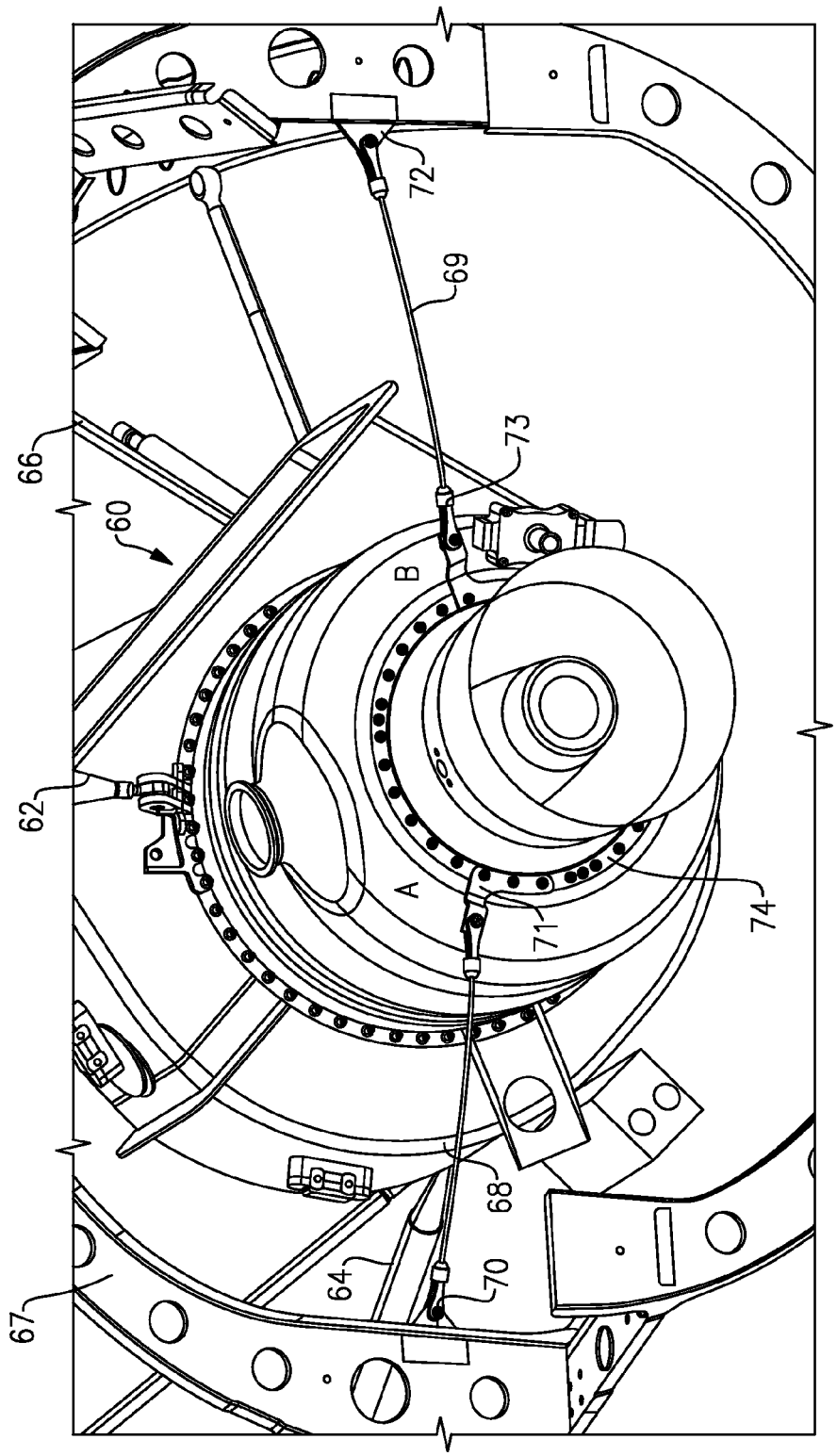
FIG. 3 shows a perspective rear view of the example auxiliary power unit of FIG. 1.
Figure 4:
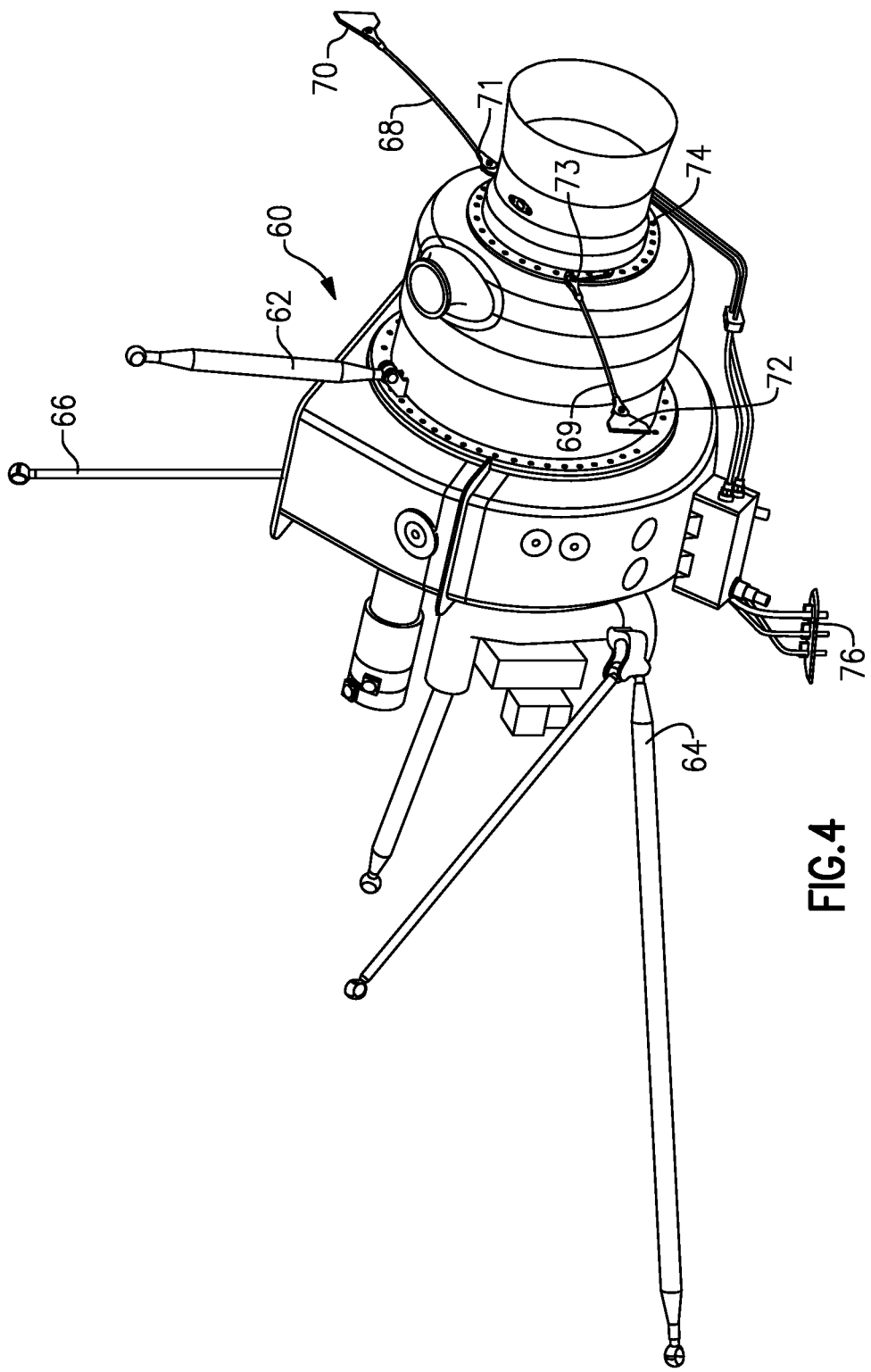
FIG. 4 shows a perspective side view of the example auxiliary power unit of FIG. 1.

Referring now to FIGS. 2 and 3, the example primary mount system 100 of the mount system 65 includes a one-point mount 62 having one linkage (see FIG. 2), a mount 64 having two linkages, and a mount 66 having three linkages. In this example, during normal operation, the linkages 62, 64, 66 support the APU 60.

An example of abnormal operation is when one or more of the linkages 62, 64, 66 of the primary mount system 100 does not provide support to the APU 60. Examples of abnormal operation include one or more of the linkages 62, 64, 66 failing.

The example redundant mount system 101 includes a redundant cable mount 68 that can secure directly to the aircraft structure 67 or through a bracket 70 mounted to the structure 67. In an embodiment, the cable 68 can attach directly to the APU 60 or to an inner bracket 71 secured to a mount flange 74 on a rear of the APU 60.

In this example, the redundant mount system 101 includes a second redundant cable mount 69. The cable 69 can secure directly to the aircraft structure 67 or through a bracket 72 mounted to the structure 67. The cable 69 can attach directly to the APU 60 or to an inner bracket 73 secured to mount flange 74 on a rear of the APU 60.

Because the redundant cables 68, 69 are configured to support the APU 60 during an abnormal operation, in an embodiment, redundant cables 68, 69 may be given slack so that they provide minimal or no support during normal operation. Providing slack would allow for ease of cable installation and, in some embodiments, would substantially eliminate interference with the primary mount system 100 during normal operation.

Referring to FIG. 3, the first cable 68 is attached to the APU 60 at a position A. The second cable 69 is attached to the APU 60 at a position B, spaced circumferentially from position A about a central axis of the APU 60. This spacing allows the redundant cables 68, 69 to restrain the APU 60 in all degrees of movement. Position A is spaced at least 90 degrees and at a substantially opposite side of the APU from position B. As one example, position A is spaced approximately 180 degrees from position B.

The APU 60 may utilize a plurality of electrical wires 76 to communicate power to the APU 60. The electrical wires 76 are distinct from the redundant cable mounts 68, 69, however in various embodiments the electrical wires 76 may be mounted to the cables, or incorporated into or around the cables.

In an embodiment of primary mount system 100, the APU 60 is mounted to the structure 67 of the vehicle through linkages 62, 64, 66. The three-point mount 66 secures the engine relative to the structure 67 in all 3 degrees of movement. The two-point mount 64 secures two degrees of rotation. The one-point mount 62 secures the third degree of rotation. Thus, the primary mount system 100 reacts 6 degrees of freedom—3 degrees of movement and 3 degrees of rotation. Such a system is statically determinate, not redundant.

A worker of ordinary skill in this art would realize that this disclosure is not limited to an embodiment having two redundant cables. One cable or more than two cables could be utilized. For example, it may also be useful to include an additional cable at the forward end of the APU to control rotation during abnormal operation.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An auxiliary power unit and mounting system comprising:
   a plurality of linkages configured to support an auxiliary power unit;
   a redundant mount configured to selectively support said auxiliary power unit;
   said redundant mount is a cable configured to be fixed to said auxiliary power unit and to an aircraft structure;
   said redundant mount being a first redundant mount, and further comprising a second redundant mount to selectively support said auxiliary power unit;
   said first redundant mount being fixed to said auxiliary power unit at a first position, and said second redundant mount being configured to be fixed to said auxiliary power unit at a second position, wherein said first position being circumferentially spaced from said second position about a central axis of said auxiliary power unit;
   both said first and second redundant mounts are cables, and wherein said first position and said second position are circumferentially spaced by at least 90° about a central axis of said auxiliary power unit, and wherein each of said cables is provided with slack.

2. The system of claim 1, wherein said plurality of linkages comprises a three-link mount, a two-link mount, and a single-link mount.

3. The system of claim 2, wherein said three link mount is configured to restrict said auxiliary power unit in three degrees of movement, said two link mount is configured to restrict said auxiliary power unit in two degrees of movement, and said single link mount is configured to restrict said auxiliary power unit in one degree of movement.

4. The system of claim 1, wherein said redundant mount is configured to support said auxiliary power unit during an abnormal operation.

5. The system of claim 1, said auxiliary power unit further comprising a plurality of electrical wires to communicate power to said auxiliary power unit, said electrical wires distinct from said redundant mount.

6. The system of claim 1, wherein said redundant mount is configured to be fixed to an aircraft structure.

7. The system of claim 1, wherein said first and second redundant mounts are fixed to an aircraft structure.

* * * * *